Oct. 18, 1949.  S. I. HAYES  2,485,286
INCLINOMETER AND COMPASS INDICATING MEANS
FOR GROUNDED AVIATION TRAINERS
Filed Jan. 2, 1948
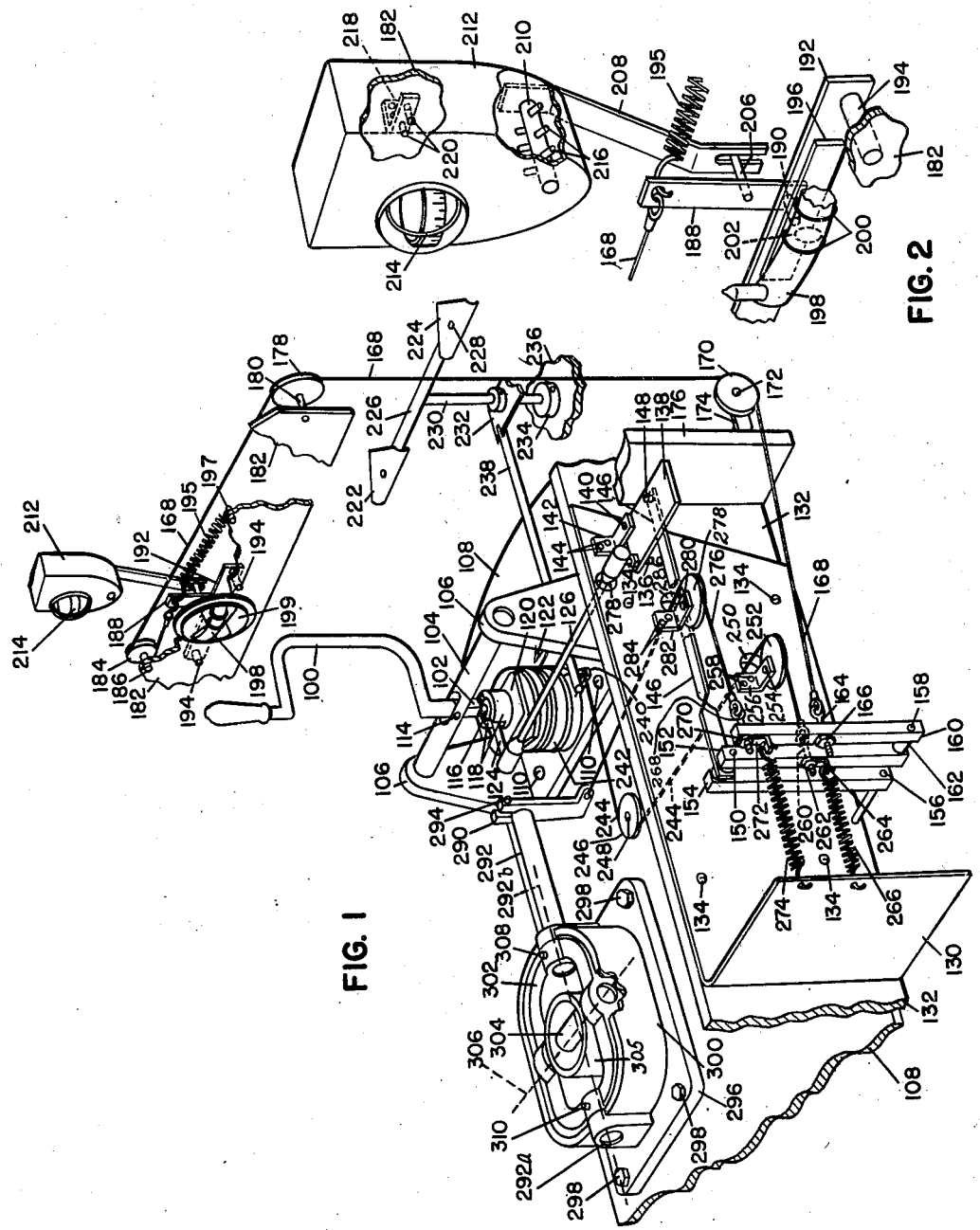
INVENTOR
STANLEY I. HAYES
BY Donald T. Hillier
ATTORNEY Patented Oct. 18, 1949

2,485,286

UNITED STATES PATENT OFFICE 2,485,286

INCLINOMETER AND COMPASS INDICATING MEANS FOR GROUNDED AVIATION TRAINERS

Stanley I. Hayes, Binghamton, N. Y., assignor to Link Aviation, Inc., Binghamton, N. Y., a corporation of New York Application January 2, 1948, Serial No. 327

3 Claims. (Cl. 35—12)

This invention relates to inclinometer and compass indicating means for use in grounded aviation trainers, and will be disclosed in conjunction with aviation trainers of the type covered by United States Patents 1,825,462 and 2,099,857 issued to Edwin A. Link, Jr.

Real aircraft generally carry an instrument known as the inclinometer which comprises a tube mounted upon the instrument panel and a ball placed inside the tube to move along the axis of the tube relative to neutral graduations thereon to indicate to the pilot of the plane the correct coordination of the banking and turning controls in the plane when the plane is being turned and banked. In the case of a properly coordinated turn, the ball in the tube remains centered with respect to the graduations thereon, while in the case of an application of insufficient bank simultaneously with the turn, the ball moves in the opposite direction of the turn to indicate that a skidding turn is being made. On the other hand, in case the plane is banked too greatly for the rate of turn the ball moves away from the neutral graduations on the tube in the direction of the turn to indicate to the pilot that a slipping turn is being made.

In the case of real aircraft, a correct turn is accomplished by proper coordination of the stick and rudder pedals in the plane, and in order to simulate the functioning of the inclinometer in a real plane this invention includes a trainer having a simulated stick and simulated rudder pedals differentially connected to the inclinometer tube in the trainer to position the tube according to the combined positions of the stick and rudder pedals so that when the correct amount of stick and rudder pedals are applied the ball in the inclinometer tube remains centered, thus indicating to the student that a correct simulated turn is being made. When insufficient rudder is applied for the degree of bank of the turn, the previously described interconnecting means operate the inclinometer tube to move the ball away from the center of the tube opposite the direction of turn to indicate that a simulated skidding turn is being made, and when too much stick is applied for the rate of turn the inclinometer tube is moved by the previously described differential interconnecting means to move the ball away from the central graduations upon the tube toward the direction of bank to indicate that a slipping turn is being made.

When the invention is employed in conjunction with a fuselage arranged to tilt to simulate the banking of a plane, an additional connection responsive to the banking position of the fuselage may also be employed to offset at least in part the movement of the ball as a result of the physical banking of the fuselage.

In order that the detailed nature of this invention may be clearly understood, reference is made to the accompanying drawings, wherein, Fig. 1 is a perspective view showing the essential parts of this invention, and Fig. 2 is a perspective view showing the detailed mounting of the inclinometer tube.

Reference is made to Fig. 1 where the conventional simulated stick control is designated 100, the lower end of this control stick passing through the slot 102 in shaft 104 which is rotatably mounted in the two brackets 106 which are suitably affixed upon the floor 108 of the fuselage of the trainer by means of the bolts 110 which pass through the base plate 112 which is formed integrally with brackets 106. The stick 100 is pivoted upon the pin 114 which passes through the shaft 104 and the slot 102 so that the stick may be moved in either direction transversely of the trainer fuselage to simulate the motion imparted to the stick in a real plane when the pilot desires to bank the plane to the left or right. By virtue of the fact that shaft 104 is rotatably mounted in the brackets 106, the stick 100 may be moved fore and aft to simulate the motion imparted to the stick in a real plane when the pilot desires to change the pitch attitude of the plane.

Carried by the lower end of stick 100 is the ball 116 which engages the fingers 118 integral with the cap 120 of the main control valve designated generally by 122. For a detailed disclosure of the construction and operation of the main control valve 122, reference may be had to the copending application of Stanley I. Hayes and Theodore Herskovits, Serial Number 328 filed January 2, 1948 for Main and auxiliary control valve arrangement for grounded aviation trainer.

Connected to the ball 116 is the rod 124 to the outer end of which is attached the left end of link 126 which runs transversely of the trainer fuselage and passes through the hole 128 in the plate 130 and upright 132. Plate 130 is affixed to the upright 132 by means of bolts 134, and upright 132 runs longitudinally of the fuselage and is suitably affixed to the base 108. The right end of link 126 is attached by pivot 136 to the plate 138 which is held by pivot 140 which in turn is carried by bracket 142 which is attached to plate 130 by the bolts 144.

The forward end of the link 146 is pivoted to plate 138 by pivot 148, and it will be appreciated that the plate 138 is in effect a bellcrank. The rear end of link 146 is pivoted upon the pin 150 which is affixed to the upper end of the arm 152 and which also passes through the upper end of arm 154 which is freely mounted upon this pin. The lower end of arm 154 is pivoted upon the stud 156, the inner end of which is carried by the plate 130. The lower end of arm 152 is affixed to the stud 158 upon which the lower end of the arm 160 is freely mounted, the stud 158 having an enlarged diameter 162 for spacing the two arms 152 and 160. The three arms 152, 154 and 160 and associated parts form a differential device, the operation of which will presently appear.

The adjustable screw eye 164 passes through the center of arm 160 and is affixed thereon by means of nut 166, and the rear end of cable 168 is attached to the forward end of screw eye 164. Cable 168 passes around the pulley 170 which is freely mounted upon the stud 172 carried by bracket 174 which in turn is carried by the member 176 affixed to the longitudinally extending member 132, and then cable 168 turns to run upwardly around pulley 178. Pulley 178 is freely mounted upon the stud 180 carried by the instrument panel 182, and at pulley 178 cable 168 turns to run transversely of the fuselage and around pulley 184 which is freely mounted upon the stud 186 also carried by the instrument panel 182. Cable 168 then is turned to run back toward the right side of the fuselage, the end of cable 168 being attached to the upper end of arm 188.

Referring now to Figs. 1 and 2, it will be seen that the arm 188 is affixed upon the forward end of shaft 190 which is suitably rotatably held by the plate 192 which is attached to the instrument panel 182 by means of studs 194. Upon the rear end of shaft 190 is affixed the plate 196 to which the inclinometer tube 198 is affixed by means of the wires 200. A butterfly opening 199 is cut in the instrument panel 182 through which the inclinometer tube 198 is visible. The tube 198 contains a suitable damping fluid and the ball 202 which is slightly smaller than the interior diameter of the tube 198 so that it will roll within the tube in response to a movement of the tube 198 about the axis of shaft 190. The wires 200 also constitute a pair of index lines which are spaced by a distance equal to the diameter of the ball 202, each wire being offset from the center of tube 198 by an amount equal to one-half the diameter of ball 202. The left end of tension spring 195 is affixed to the upper end of arm 188, the right end of this spring being anchored to stud 197 carried by panel 182.

The arm 188 carries the pin 206 which lies between the bifurcations of the lower end of arm 208, the upper end of which is affixed upon the rotor 210 rotatably mounted in the case 212 carrying the compass scale 214. Affixed upon the rotor 210 are the conventional metallic North-South compass adjusting elements 216. The compass case 212 is suitably affixed to the instrument panel 182 by means of brackets and screws 218 and 220.

Referring back to Fig. 1, it will be seen that the left and right rudder pedals are designated by 222 and 224 and are affixed upon the rudder bar 226 by means of pins 228. The rudder bar 226 is affixed upon the vertical post 230 upon which is affixed the arm 232, the lower end of the rudder post 230 being rotatably held in the bearing block 234 held by the fixed member 236 which is suitably located inside the trainer fuselage. To the outer end of arm 232 is pivotally attached the forward end of link 238, the rear end of which is pivotally attached to the arm 240 integral with the rudder leaf 242 of the main valve 122. The forward end of the cable 244 is attached to the arm 240, and this cable extends rearwardly of the fuselage to encircle the pulley 246 which is freely mounted upon the vertical stud 248 affixed to the bottom 108 of the fuselage. Cable 244 then runs transversely of the fuselage and then passes through the hole 250 in the plate 130 and vertical member 132, and then around the pulley 252 which is freely mounted upon the stud 254 carried by bracket 256 which is affixed to plate 130 by screws 258. The rear end of cable 244 is attached to the adjustable screw eye 260 which passes through the center of the arm 152 and which is held on arm 152 by the nut 262. The adjustable screw eye 260 also carries the clip 264 to which the forward end of the tension spring 266 is attached, the rear end of this spring being carried by the transversely extending portion of the plate 130.

The upper end of the arm 160 carries the adjustable screw eye 268, by means of nut 270, and the rear end of this screw eye carries the clip 272 to which is attached the forward end of the compression spring 274, the rear end of this spring being held by the transversely extending end of plate 130. The rear end of cable 276 is attached to the forward end of screw eye 268, and this cable passes around the pulley 278 which is freely mounted upon stud 280 carried by bracket 282 which is affixed to plate 130 by means of screws 284. Cable 276 passes through the hole 286 in plate 130 and member 132, and the other end of this cable is attached to the lower end of arm 290 which is affixed upon the longitudinally extending rod 292 by means of set screw 294.

Considering now the detailed construction of the universal joint which supports the trainer fuselage relative to the stationary base, as is well known to those skilled in the art, it will be seen that the base plate 296 is affixed upon the floor 108 of the fuselage by means of bolts 298, and integral with the base plate 296 is the outer gimbal 300. The inner gimbal is designated 302 and is freely mounted upon the pin 304 which is fixedly held by the upper end of the vertical spindle 305 which is rotably mounted in the stationary base of the trainer, as is also well known to those skilled in the art. The inner gimbal 302 is freely mounted upon the stud 304 to move about the transverse axis 306. The outer gimbal 300 is freely mounted upon the rod 292, the rear end of which is affixed in gimbal 302 by means of set screw 308, and the rod 292a has its rear end pivotably mounted in the outer gimbal 300 while its forward end is pinned to the inner gimbal 302 by means of pin 310. The rods 292a and 292 are co-axial, and their axes form the longitudinal axis 292b.

By virtue of this construction it will be appreciated that when the fuselage is banked to the left by a movement to the left of stick 100, as is well understood by those skilled in the art, the gimbal 302 does not move, but that the outer gimbal 300, floor 108 and all parts affixed thereto will rotate counterclockwise about the longitudinal axis 292b, as seen from the rear, and that when the fuselage is banked to the right by an opposite movement of stick 100 the same parts will move in the opposite direction about axis 292b. When the nose of the fuselage is lowered by a forward movement of stick 100, both gimbals 302 and 300 rotate clockwise about the transverse axis 306, as seen from the right side of the fuselage, and the floor 108 and all parts affixed thereto move in the same direction. When the fuselage pitching action is reversed to raise the nose of the fuselage in response to a rearward movement of stick 100, the same parts move about the transverse axis 306 in the opposite direction.

Inasmuch as upon a banking of the fuselage the inner gimbal 302 does not move, it will be appreciated that the shaft 292 similarly does not move, and that the arm 290 affixed upon the forward end of this shaft remains vertically disposed at all times.

*Operation*

Assuming that the student in the trainer moves the control stick 100 to the left to bank the fuselage to the left, but retains the rudder pedals 222 and 224 in their centered positions, the link 126 will move to the right rotating the bellcrank 138 counterclockwise as seen from above and moving the link 146 ahead. The arm 154 will be rotated clockwise as seen from the right about the pivot 156 and the upper end of arm 152 will move with the upper end of arm 154. The spring 266 and cable 244 hold the screw eye 260 from moving fore and aft, thus providing a pivot for arm 152, and the lower end of arm 152 moves to the rear. The stud 158 and lower end of arm 160 move in the same direction, spring 274 and cable 276 providing a pivot for the upper end of arm 160. The rearward movement of the lower end of arm 160 will result in a similar movement of the lower end of cable 168, and this cable will be pulled to move the upper end of arm 188 to the left, rotating this arm and the tube 198 of the indicator counterclockwise as seen by the student. This rotation of the tube 198 will result in a movement of the ball 202 to the left, thus indicating to the student that the trainer is in a simulated slipping left turn. Assuming that to correct this faulty simulated handling of the fuselage, the student then moves the left rudder pedal 222 ahead, link 238 will move in the same direction and cable 244 will be pulled to move the screw eye 260 ahead, resulting in a counterclockwise rotation of the arm 152 about the pivot 150. The stud 158 will move ahead as will the lower end of the arm 160, arm 160 pivoting about the screw eye 268 held by spring 274 and cable 276, and the cable 168 will be released by an amount dependent upon the forward movement of the rudder pedals 222. The spring 195 will rotate the arm 188 and inclinometer tube 198 clockwise as seen by the student, and the ball 202 will move back toward the center of the tube 198. If the student applies just the correct amount of left rudder, the ball 202 will be returned to its centered position with respect to the index wires 200 upon the tube 198, and then the rate of turning of the fuselage will be correct for the degree of bank. An insufficient amount of application of left rudder will only partially return the ball to its neutral position, thus indicating to the student that even more left rudder must be applied, and an overapplication of left rudder will result in a rotation of the tube 198 clockwise so that the ball 202 moves to the right of the wires 200 upon the tube, thus indicating to the student that an overapplication of left rudder has been applied and that the trainer is in a simulated skidding left turn.

As the fuselage starts to bank to the left, the instrument panel and tube 198 are tilted to the left, and the ball 202 moves to the left of its neutral position. By virtue of the fact that arm 290 remains vertical, and the distance from the lower end of arm 290 to the stud 280 upon which pulley 278 is mounted increases with a left bank, cable 276 is pulled resulting in a forward movement of the upper end of arm 160, and in a releasing of cable 168, resulting in a clockwise rotation of tube 198. However, the clockwise rotation of tube 198 as a result of the banking of the fuselage is not sufficient to completely offset the movement of the ball in tube 198 as a result of the banking of the fuselage. Consequently, ball 202 will remain to the left of its neutral position with respect to wires 200, except for the fact that as the fuselage starts to bank to the left, in accordance with good flying practice the student should gradually return the stick to neutral and then apply a slight amount of right stick, at the same time releasing the applied left rudder. Consequently, the final position of the apparatus is with the fuselage banked to the left, a slight amount of right stick being applied, with the rudder pedals centered. The ball 202 will be centered, and the trainer will be turning to the left as a result of the conventional automatic turn with bank feature incorporated in trainers of the type being considered.

On the other hand, assuming that the student moves the control stick 100 to the right to place the fuselage in a simulated right bank, the link 146 moves to the rear, rotating the arm 154 counterclockwise about the pivot 156 and rotating the arm 152 counterclockwise about the screw eye 260 which will be held by the spring 266 and cable 244. The bottom end of arm 152 moves ahead, as does the bottom end of arm 160 which will be moved about the screw eye 268 held by spring 274 and cable 276, and the rear end of cable 168 is released. The spring 195 pulling upon the upper end of cable 168 results in a clockwise rotation of the arm 188 and inclinometer tube 198, as seen by the student, and the ball 202 moves to the right of the graduation upon the tube, thus indicating to the student that the trainer is in a simulated slipping right bank. If in order to correct the improper banking of the trainer, the student applies right rudder, the link 238 moves to the rear releasing cable 244 and spring 266 will move the lower end of arm 152 to the rear, the arm pivoting about the pin 150. The lower end of arm 160 also will move to the rear, arm 160 pivoting about screw eye 268 held by spring 274 and cable 276, resulting in a pulling upon the rear end of cable 168, and the arm 188 and tube 198 will be rotated counterclockwise as seen by the student in the trainer, thus returning the ball 202 toward its neutral position in tube 198. An insufficient application of right rudder will not return the ball 202 to the neutral position, the correct amount of right rudder will return the ball 202 to its neutral position, and an overapplication of right rudder will result in a returning of the ball 202 past the wires 188 upon the tube 198, thus indicating to the student that the trainer is in a simulated skidding right turn.

As the fuselage starts to bank to the right, the instrument panel and tube 198 are tilted to the right, and the ball 202 moves to the right of its neutral position. By virtue of the fact that arm 290 remains vertical, and the distance from the lower end of arm 290 to the stud 280 upon which pulley 278 is mounted decreases with a right bank, cable 276 is released resulting in a rearward movement of the upper end of arm 160, and in a pulling of cable 168, resulting in a counterclockwise rotation of tube 198. However, the counterclockwise rotation of tube 198 as a result of the banking to the right of the fuselage is not sufficient to completely offset the movement of the ball in tube 198 as a result of the banking of the fuselage. Consequently, ball 202 will remain to the right of its neutral position with respect to wires 200, except for the fact that as the fuselage starts to bank to the right, in accordance with good flying practice the student should gradually return the stick to neutral and then apply a slight amount of left stick, at the same time releasing the applied right rudder. Consequently, the final position of the apparatus is with the fuselage banked to the right, a slight amount of left stick being applied, with the rudder pedals centered, the ball 202 will be centered and the trainer will be turning to the right as a result of the conventional automatic turn with bank feature incorporated in trainers of the type being considered.

Assuming that the student in the trainer moves the left rudder pedal 222 ahead to turn the fuselage, but that the control stick 100 is retained in its neutral position, the link 238 moves ahead pulling cable 244 and resulting in a forward movement of the bottom of arms 152 and 160, arm 152 pivoting about pivot 150 and arm 160 pivoting about the screw eye 268 held by the spring 274 and cable 276. The forward movement of the lower end of arm 160 will release the cable 168 which will be pulled by the spring 195 resulting in a clockwise rotation of tube 198 and a movement of the ball 202 to the right of its neutral position, thus indicating to the student that the trainer is in a simulated left skidding turn. This situation may be corrected by a movement of the control stick 100 to the left which will move the link 146 ahead, and as previously explained cable 168 will be pulled so that the arm 188 and inclinometer tube 198 will be rotated counterclockwise back toward its neutral position, resulting in a returning of the ball 202 to its neutral position in tube 198. The application of the correct amount of left stick will result in a returning of the ball to its neutral position while an over-application of left stick will result in a movement of ball 202 beyond the neutral position, thus indicating to the student that the trainer is in a simulated slipping left turn and insufficient application of left stick will not entirely eliminate the simulated skidding left turn.

The effect of banking of the fuselage upon the position of the ball 202 will be as previously explained, and the controls will be operated as previously set forth, to maintain the properly coordinated turn, once the same is established.

On the other hand, when the student in the trainer presses the right rudder pedal 224 ahead to produce a turning of the fuselage to the right, retaining the stick 100 in its neutral position, the link 238 moves to the rear releasing cable 244, and spring 266 moves the lower end of the arm 152 to the rear, this arm pivoting about the pin 150. The movement to the rear of the lower end of arm 152 results in a similar movement of the lower end of arm 160, and cable 168 is pulled, resulting in a counterclockwise rotation of the inclinometer tube 198. The ball 202 moves to the left of its neutral position with respect to the inclinometer tube, thus indicating to the student that the trainer is in a simulated skidding right turn. Should the student then move the control stick 100 to the right to correct the faulty simulated turn, the link 146 moves to the rear, resulting in a clockwise rotation of the arm 188 and tube 198, resulting in a movement of ball 202 back toward its neutral position. The correct amount of applied left stick will center the ball 202 relative to tube 198; an over-application of right stick will move the ball 202 to the right past its neutral position in tube 198, thus indicating to the student that the trainer is in a simulated right slipping turn, and an insufficient application of right stick will not move ball 202 back to its neutral position, thus indicating a continuing right skidding turn.

The effect of banking to the right of the fuselage upon the position of ball 202 will be as previously explained, and the controls should be properly operated, as hereinbefore set forth, to maintain the properly coordinated turn, once the same is established.

It will be appreciated that the indications given by the simulated inclinometer depend upon the banking position of the fuselage, and upon the position of cable 168, and that the position of cable 168 is responsive to the combined positions of the stick 100 and rudder pedals 222 and 224, as well as the banking position of the fuselage. Stick movement in one direction moves the cable 168 in one direction, while rudder movement in the same direction moves the cable 168 in the opposite direction, so that when the proper amount of stick and coordinated rudder are applied to commence the execution of a correctly coordinated left turn, the cable 168 is neutrally positioned and inclinometer tube 198 and ball 202 are centered to indicate a properly coordinated left turn. As the fuselage starts to bank, the ball would have a tendency to roll toward the direction of bank to indicate a slipping turn, but the application of a slight amount of opposite stick will recenter the ball, and this last motion may be coordinated with a neutralizing of the rudder pedals to keep the ball centered at all times.

Insofar as the reading of the simulated magnetic compass 214 is concerned, any movement of the arm 188 from its neutral position as a result of the turning and banking of the fuselage will result in a rotation of the rotor 210 carrying the metallic elements 216 to deflect the compass scale 214 to cause the compass indication to lead or lag the turning of the fuselage, thus simulating the northerly turning error to which real magnetic compasses in aircraft are subject.

It will be appreciated by those skilled in the art that many changes may be made of the disclosed embodiment of this invention without departing from the substance thereof as covered by the following claims. All such changes are intended to be covered by the claims.

I claim:

1. In a grounded aviation trainer of the type having a fuselage mounted upon a universal joint for banking in simulation of the banking of a real plane in actual flight, and an instrument panel in said fuselage, the combination of an inclinometer tube and ball therein rotatably mounted near said panel, a differential device having an output member connected to said inclinometer tube for rotatably positioning the same, a first manual control in said trainer simulating the banking control of a real plane, a left and a right rudder pedal in said fuselage simulating the rudder pedals of a real plane, a connection between said first manual control and said differential device and a connection between said rudder pedals and said differential device for operating said output member to position said inclinometer tube in accordance with the combined positions of said first manual control and said rudder pedals, and means responsive to the banking of said fuselage connected to said differential device for rotating said tube clockwise in response to a banking to the left of said fuselage and counterclockwise in response to a banking to the right of said fuselage.

2. The structure set forth in claim 1 in which the connections and differential device are arranged so that a movement of the first manual control to the left rotates the inclinometer tube counterclockwise and a movement to the right rotates the inclinometer tube clockwise, while a forward movement of the left rudder pedal rotates the tube clockwise and a forward movement of the right rudder pedal rotates the tube counterclockwise.

3. The structure set forth in claim 1 in which the differential device comprises three arms selectively pivoted to one another, each of said arms having connected thereto one of the described input connections, the output member being connected to one of the three arms.

STANLEY I. HAYES.

REFERENCES CITED

The following references are of record in the file of this patent:

UNITED STATES PATENTS

| Number | Name | Date |
|---|---|---|
| 2,099,857 | Link | Nov. 23, 1937 |
| 2,243,973 | Mills | June 3, 1941 |
| 2,336,711 | Barber | Dec. 14, 1943 |
| 2,366,603 | Dehmel | Jan. 2, 1945 |
| 2,409,238 | Barber | Oct. 15, 1946 |

FOREIGN PATENTS

| Number | Country | Date |
|---|---|---|
| 396,540 | Great Britain | Aug. 10, 1933 |